United States Patent [19]

Mustee et al.

[11] Patent Number: 5,722,560
[45] Date of Patent: Mar. 3, 1998

[54] UTILITY TUB WITH SAFETY LOCKING LEGS

[75] Inventors: Robert J. Mustee; William Edward Trsek, both of Middleburg Heights, Ohio

[73] Assignee: E. L. Mustee & Sons, Inc., Cleveland, Ohio

[21] Appl. No.: 686,501

[22] Filed: Aug. 22, 1996

[51] Int. Cl.[6] .................................................. F16M 11/20
[52] U.S. Cl. ............................. 220/630; 248/188; 312/111
[58] Field of Search ................................... 220/630, 636, 220/DIG. 28; 248/151, 188; 312/111, 263

[56] References Cited

U.S. PATENT DOCUMENTS

| | | | |
|---|---|---|---|
| 138,718 | 5/1873 | Wattles | 248/188 |
| 274,614 | 3/1883 | Kelly | 248/188 |
| 2,938,759 | 5/1960 | Mutchnik et al. | 248/188 |
| 2,970,025 | 1/1961 | Wilson | 248/188 |
| 3,384,230 | 5/1968 | Mustee . | |
| 3,964,810 | 6/1976 | Murphy | 312/111 |
| 4,496,125 | 1/1985 | Walsh et al. | 248/188 |

Primary Examiner—Steven M. Pollard
Attorney, Agent, or Firm—Watts, Hoffmann, Fisher & Heinke, Co., L.P.A.

[57] ABSTRACT

Legs for a utility tub each have an upper end portion including a mounting surface disposed in a region of an interior corner of the leg. Pockets are disposed adjacent a bottom wall of the utility tub. Fasteners may be used to mount each of the mounting surfaces in one of the pockets. The L-shape of each leg is formed by two leg sections that converge to form a corner of the leg. Each of the leg sections has an outer peripheral edge at the upper end portion that is inwardly tapered at an angle of about 5° from a vertical axis. A slot at the corner of each leg forms an inner peripheral edge on each leg section. Each inner peripheral edge has a taper that extends inwardly at an angle of about 5° from a vertical axis.

15 Claims, 1 Drawing Sheet

UTILITY TUB WITH SAFETY LOCKING LEGS

FIELD OF THE INVENTION

The present invention relates to utility tubs and, in particular, to a utility tub designed to prevent its legs from collapsing.

BACKGROUND OF THE INVENTION

A utility or laundry tub is supported by four legs when in use, each leg fitting into a pocket on the underside of the tub. The legs are constructed to have a generally L-shape in transverse cross-section. The pockets are typically triangularly shaped from a bottom plan view and include a wall extending diagonally across each corner of the tub. The utility tub body may be comprised of injected molded plastic. One example of a typical utility tub is described in U.S. Pat. No. 3,384,230 to Mustee, which is incorporated herein by reference in its entirety.

Utility tub legs are comprised of metal or plastic, each of these materials presenting certain advantages or drawbacks when used with plastic utility tubs. Metal legs may be mounted in the pockets without fasteners. By constructing the legs of metal, the legs may be forcibly fitted into the plastic pockets. Therefore, the size of the pockets is not critical. If the pockets are too small, the metal digs into them to form a tight fit.

Plastic utility tub legs need to be used with a pocket having a size that is precisely controlled. If the pockets are too small, the plastic legs cannot be forced into the pockets without damaging the legs. If the pockets are too large, the legs will simply fall out. A utility tub is very heavy when filled with water and can cause serious personal injury if the legs collapse. At the present time, using plastic legs or using legs without fasteners is hazardous, since the legs can pull out of the pockets and collapse when bumped accidentally.

SUMMARY OF THE INVENTION

The present invention relates to safety locking leg assemblies for utility tubs, which overcome the need to precisely control the size of the pockets and legs. Even though the sizes of the pockets and legs need not be precisely controlled, the legs fit securely in the pockets and avoid collapsing.

A preferred embodiment of the invention comprises a mounting surface or gusset disposed at an upper end portion of utility tub legs and a fastener for mounting each mounting surface in one of the pockets. The L-shape of each leg is formed by two leg sections that converge to form a corner of the leg. Each of the leg sections has an outer peripheral edge at the upper end portion that is inwardly tapered at an angle of about 5° from a vertical axis. A slot near the corner of each leg forms an inner peripheral edge on each leg section. Each inner peripheral edge has a taper that extends inwardly at an angle of about 5° from a vertical axis. Each of the pockets includes bosses having surfaces with tapers that correspond to the tapers of the leg sections.

More specifically, each mounting surface has a fastener opening therein which can be aligned with a fastener opening formed in one of the bosses. A screw can pass through the fastener opening in the mounting surface and into the fastener opening in the boss to fasten the leg in the pocket.

In one aspect of the invention, the legs are fastened in the pockets using only the mounting surface feature. In another aspect, the legs are fastened in the pockets using only the tapered locking surface feature without the mounting surfaces or fasteners.

The utility tub of the present invention does not suffer from the problems of conventional utility tubs. The exterior and interior tapers on the leg sections allow the legs to be locked securely in the pockets even without fasteners. The additional use of the fasteners provides a very strong and safe connection between the legs and the tub. The legs will not collapse even when the tub and its legs are bumped, and thus avoids serious personal injury.

Other embodiments of the invention are contemplated to provide particular features and structural variants of the basic elements. The specific embodiments referred to as well as possible variations and the various features and advantages of the invention will become better understood from the accompanying drawings and the detailed description that follows.

DETAILED DESCRIPTION OF PREFERRED EMBODIMENTS

Figure 1:
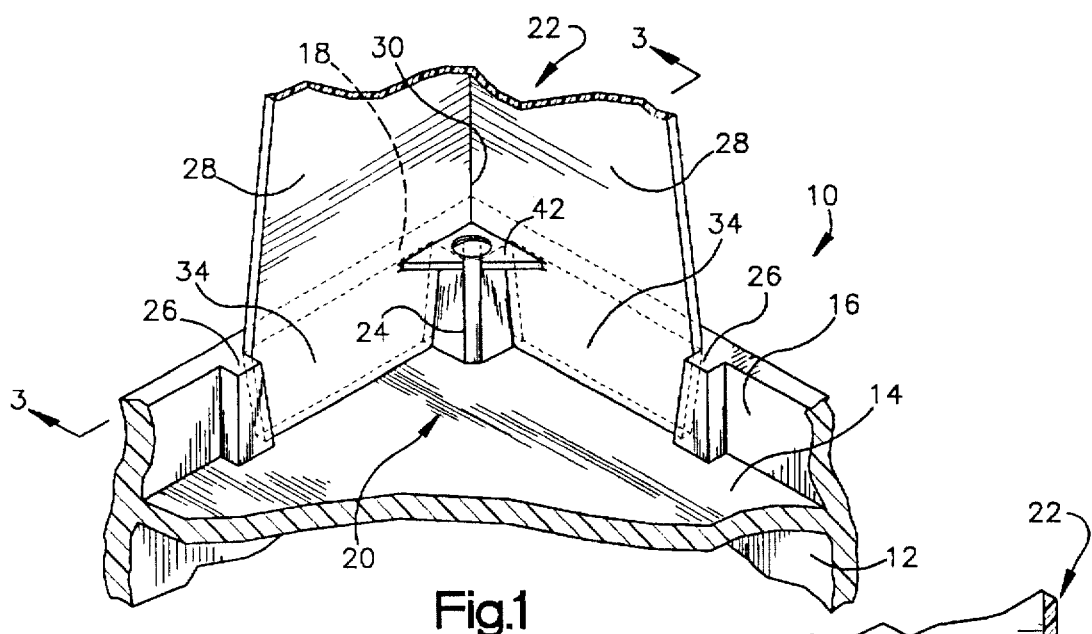
FIG. 1 is a fragmentary cross-sectional perspective view of the underside of a utility tub employing a safety locking leg assembly constructed in accordance with the present invention.
Figure 3:
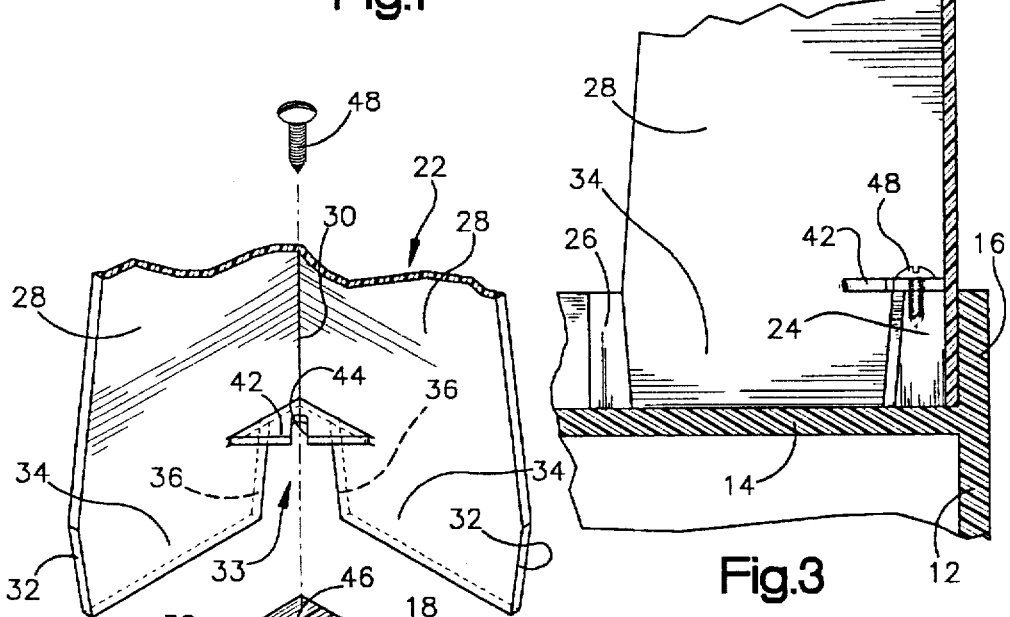
FIG. 3 is a cross-sectional view as seen with respect to the plane taken along lines 3—3 in FIG. 1.

Referring to the drawings, a utility tub is referred to generally at 10, the tub being shown inverted. The tub 10 includes a body having side walls 12 and a bottom wall 14. A continuous base flange 16 extends around the bottom wall. The base flange 16 converges to form four corners 18 (FIG. 2), only one of which is shown in the drawings. A pocket 20 is disposed at each of the corners and receives a leg 22.

The legs and the body of the tub are comprised of an elastomeric material. A preferred material is a thermoplastic material such as polypropylene foam.

Each of the pockets 20 includes three bosses beneath the bottom wall 14. A corner boss 24 is disposed at the corner 18. Two outer bosses 26 are equally spaced from the corner boss 24 along the base flange 16.

Each of the legs 22 is generally L-shaped in transverse cross-section. The L-shape of each leg is formed by two leg sections 28 that converge to form a corner 30 of the leg. Each of the leg sections 28 has an outer peripheral edge 32 (FIG. 2) that is inwardly tapered at an angle of about 5° from a vertical axis. A slot 33 forms tabs 34 in the legs that fit into spaces between the bosses. The slot 33 forms an inner peripheral edge 36 on each leg section. Each inner peripheral edge 36 has a taper that extends inwardly at an angle of about 5° from a vertical axis. The leg sections preferably include tapers on both the inner and outer peripheral edges.

The bosses preferably have surfaces with tapers that correspond to the tapers of the leg sections. That is, the corner boss 24 has two surfaces 38 that are each tapered at 5° from a vertical axis. This taper corresponds to the taper of the inner peripheral edges 36 so that the surfaces 38 and the inner edges 36 can contact or mate with each other along their entire lengths. Each of the outer bosses 26 has a surface 40 (FIG. 2) that is tapered at 5° from a vertical axis. These tapers correspond to the inward tapers of the outer peripheral edges 32 so that the surfaces 40 and the outer edges 32 can contact or mate with each other along their entire lengths.

The locking feature of the present invention is realized by employing a taper of about 5° from a vertical axis. According to the locking feature, a jarring force imposed adjacent an outer peripheral edge 32 of one of the leg sections 28, for example, will direct a force near the inner peripheral edge 36 of that leg section, thereby locking the legs in the pockets.

Figure 2:
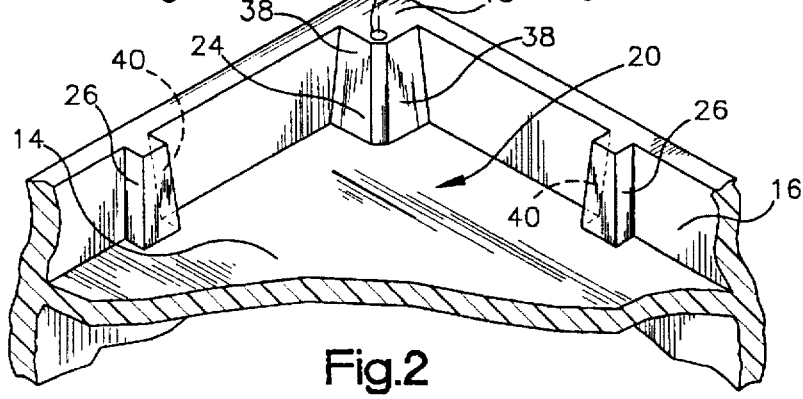
FIG. 2 is an exploded perspective view of the structure shown in FIG. 1.

Triangularly shaped mounting surfaces or gussets 42 are preferably disposed in the corners 30 below the slots 33. Each gusset 42 preferably has a fastener opening 44 therein which is aligned with a fastener opening 46 formed in the corner boss 24. The gusset opening 44 can be a hole or a slot as shown in FIG. 2, and extends through the gusset 44. The opening 46 is preferably formed by internal threads in the corner boss 24.

The gussets 42 are preferably integrally formed with the legs 22 at the interior corner. However, those skilled in the art will appreciate in view of this disclosure that the gussets could be located on the exterior of the leg, that more than one gusset could be used with each leg and that other forms of fasteners may be used.

The legs 22 are assembled onto the utility tub by positioning them in alignment with the pockets 20. Each of the legs is inserted into one of the pockets. The legs are locked in the pockets by engaging the tapered outer edges 32 with the tapered surfaces 40 of the outer bosses 26 and by engaging the tapered inner edges 36 with the tapered surfaces 38 of one of the corner bosses 24.

Once the legs are fully inserted into the pockets, each of the gussets 42 engages a corner boss 24. The fastener opening 44 in each gusset is aligned with the corresponding fastener opening 46 in the corner boss 24. A screw 48 is then inserted through the opening 44 and threaded into the opening 46 to strongly and safely mount each of the legs in their pockets. The legs may be secured in the pockets using either the tapered locking surface feature or the mounting surface and fastener feature, but both features are preferably used to most effectively prevent collapsing of the legs.

Although the invention has been described in its preferred form with a certain degree of particularity, it will be understood that the present disclosure of the preferred embodiments has been made only by way of example and that various changes may be resorted to without departing from the true spirit and scope of the invention as hereafter claimed.

What is claimed is:

1. In a utility tub for containing liquid, the utility tub including pockets disposed adjacent a bottom wall of the tub and legs for fitting into the pockets, each of said legs being generally L-shaped in cross-section, the improvement comprising:

legs having the L-shape formed by two leg sections that converge to form a corner of each said leg, wherein a slot near the corner at an upper end portion of each said leg forms an inner peripheral edge on each said leg section, and each said inner peripheral edge has a taper that extends inwardly at an angle of about 5° with respect to a vertical axis;

surfaces disposed in said pockets each having a taper that corresponds to each said inner peripheral edge taper; and a mounting surface connected to the leg sections at the upper end portion at an interior portion of the corner of each said leg and a fastener for mounting each said mounting surface in one of said pockets.

2. In a utility tub for containing liquid, the utility tub including pockets disposed adjacent a bottom wall of the tub and legs for fitting into the pockets, each of said legs being generally L-shaped in cross-section, the improvement comprising:

a mounting surface disposed at an upper end portion of the legs and a fastener for mounting each said mounting surface in one of said pockets, wherein the L-shape of each of the legs is formed by two leg sections that converge to form a corner of each said leg, each of said leg sections has an outer peripheral edge at the upper end portion that is inwardly tapered at an angle of about 5° from a vertical axis, a slot near the corner of each leg forms an inner peripheral edge on each said leg section, and each said inner peripheral edge has a taper that extends inwardly at an angle of about 5° from a vertical axis, wherein each of said pockets includes bosses having surfaces with tapers that correspond to the tapers of said leg sections.

3. The improvement of claim 2 wherein each of said mounting surfaces has a fastener opening therein which can be aligned with a fastener opening formed in one of said bosses.

4. The improvement of claim 1 wherein each of said mounting surfaces is triangularly shaped.

5. In a utility tub for containing liquid, the utility tub including pockets disposed adjacent a bottom wall of the tub and legs for fitting into the pockets, each of said legs being generally L-shaped in cross-section, the improvement comprising:

legs having the L-shape formed by two leg sections that converge to form a corner of each said leg, each of said leg sections having an outer peripheral edge at an upper end portion of said legs that is inwardly tapered at an angle of about 5° with respect to a vertical axis, and wherein a slot near the corner of each said leg forms an inner peripheral edge on each said leg section, and each said inner peripheral edge has a taper that extends inwardly at an angle of about 5° from a vertical axis, wherein said pockets include bosses having surfaces with tapers that correspond to the tapers of said leg sections.

6. In a utility tub for containing liquid, the utility tub including pockets disposed adjacent a bottom wall of the tub, a protuberance in each said pocket and legs for fitting into the pockets, each of said legs being generally L-shaped in cross-section, the improvement comprising: a mounting surface connected to an interior portion of a corner of each of the legs, said mounting surface being constructed and arranged to abut against the protuberance, and a fastener for mounting each said mounting surface in one of said pockets.

7. The improvement of claim 6 wherein each of said mounting surfaces is triangularly shaped.

8. The improvement of claim 6 wherein each of said mounting surfaces has a fastener opening therein that can be aligned with a fastener opening formed in a surface of one of said pockets.

9. The improvement of claim 6 wherein the L-shape or the legs is formed by two leg sections that converge to form a corner of each said leg, and each of said leg sections has an outer peripheral edge at the upper end portion that is inwardly tapered at an angle of about 5° from a vertical axis.

10. In a utility tub for containing liquid, the utility tub including pockets disposed adjacent a bottom wall of the tub and legs for fitting into the pockets, each of said legs being generally L-shaped in cross-section, the improvement comprising; a mounting surface disposed in an interior corner of each of the legs and a fastener for mounting each said mounting surface in one of said pockets, wherein a slot near the corner of each said leg forms an inner peripheral edge on each said leg section, each said inner peripheral edge has a taper that extends inwardly at an angle of about 5° with respect to a vertical axis and said pockets comprise surfaces each with a taper that corresponds to said inner peripheral edge taper.

11. In a utility tub for containing liquid, the utility tub including pockets disposed adjacent a bottom wall of the tub and legs for fitting into the pockets, each of said legs being generally L-shaped in cross-section, the improvement comprising; a mounting surface disposed in an interior corner of each of the legs and a fastener for mounting each said mounting surface in one of said pockets, wherein the L-shape of the legs is formed by two leg sections that converge to form a corner of each said leg, each of said leg sections has an outer peripheral edge at the upper end portion that is inwardly tapered at an angle of about 5° from a vertical axis and said pockets include bosses having surfaces with tapers that correspond to the tapers of said leg sections.

12. The improvement of claim 5 wherein said tub and said legs are comprised of elastomeric material.

13. In a utility tub for containing liquid, the utility tub including pockets disposed adjacent a bottom wall of the tub and legs for fitting into the pockets, each of said legs being generally L-shaped in cross-section, the improvement comprising:

legs having the L-shape formed by two leg sections that converge to form a corner of each said leg, each of said leg sections having an outer peripheral edge at an upper end portion of said legs that is tapered at an angle of about 5° with respect to a vertical axis, and wherein a slot near the corner of an upper end portion of each said leg forms an inner peripheral edge on each said leg section, and each said inner peripheral edge has a taper that extends at an angle of about 5° with respect to a vertical axis, wherein said pockets comprise surfaces with tapers that correspond to the tapers of said leg sections.

14. The improvement of claim 13 comprising a mounting surface connected to the leg sections at the upper end portion at an interior portion of the corner of each said leg and a fastener for mounting each said mounting surface in one of said pockets.

15. The improvement of claim 13 wherein said tub and said legs are comprised of elastomeric material.

* * * * *